May 26, 1959 C. L. WANLASS 2,888,580
TRANSISTOR MULTIVIBRATOR
Filed May 2, 1955
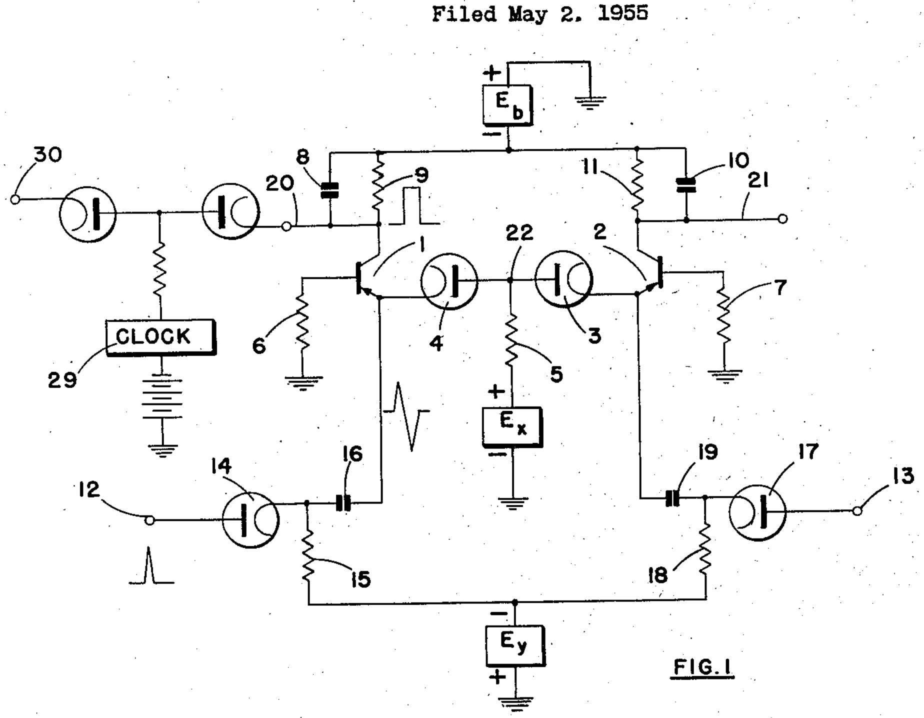
FIG. I
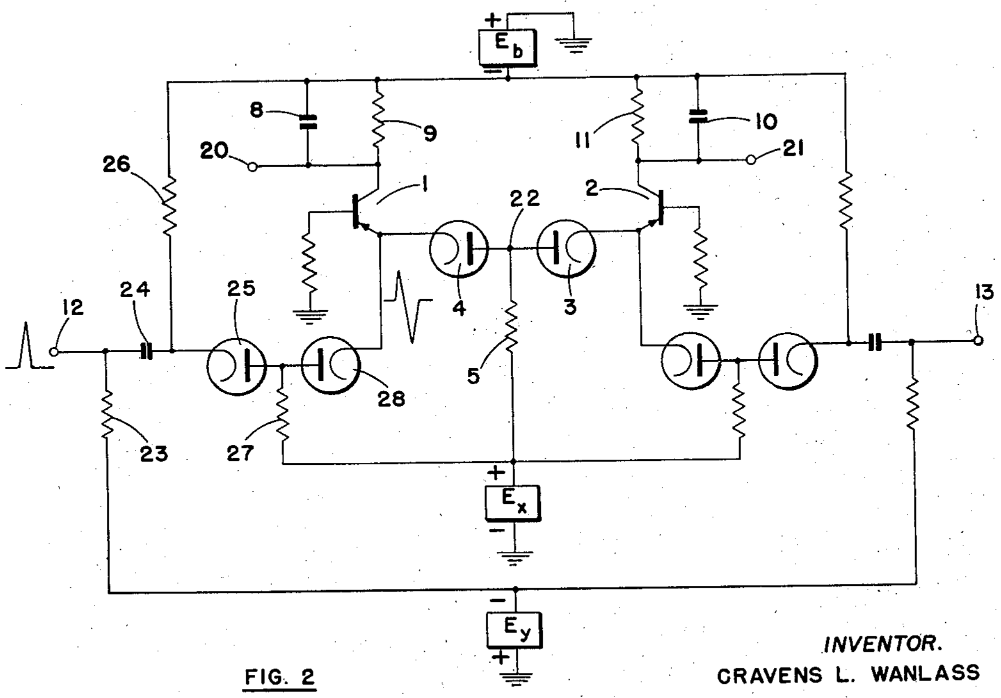
FIG. 2
INVENTOR.
CRAVENS L. WANLASS
BY
ATTORNEY United States Patent Office 2,888,580

Patented May 26, 1959

2,888,580

TRANSISTOR MULTIVIBRATOR

Cravens L. Wanlass, Whittier, Calif., assignor to North American Aviation, Inc.

Application May 2, 1955, Serial No. 505,393

2 Claims. (Cl. 307—88.5)

This invention relates to relaxation oscillators and more particularly to multivibrators using transistors.

Transistors offer several advantages over electron tubes, namely, compactness, lower heat dissipation and lower power requirements. Where a very large number of such elements are required, each one of these aspects can become an important consideration.

A multivibrator is an electronic device which may or may not require a trigger pulse to provide an abrupt change from conduction by one tube, or transistor, to conduction by another.

A multivibrator is ordinarily composed of a pair of coupled amplifying devices such as transistors or tubes. At alternate intervals, the output of one, which is conducting, is used to bias the other to cutoff, and vice versa. Conventionally, bias of a monostable multivibrator is retained for a given length of time by the use of R-C cricuit decay time.

A nonconducting electronic tube held at cutoff by a control voltage exhibits high plate impedance. Spurious and transient effects do not readily operate to change the state of a multivibrator using tubes. On the other hand, a transistor exhibits relatively low impedance even when nonconducting and some additional means is necessary to provide a reliable control over the conduction or nonconduction of each transistor, or what is the same, over the state of the multivibrator.

The method of triggering the multivibrator is also important, because such triggering method must operate to reliably initiate or terminate the conduction of one transistor or the other.

This invention contemplates holding the nonconducting transistor at cutoff by a diode acting as an open switch which is held open as long as the conducting transistor continues to conduct. Providing switching diodes in the transistor circuit provides an additional advantage in that added protection of the transistors is obtained.

The invention herein described is one of simplicity and its reliability is not reduced by power being withdrawn from the circuit.

It is an object therefore of this invention to provide an improved multivibrator.

It is an object of this invention to provide a transistor multivibrator with improved control over the separate states of said multivibrator.

It is another object of this invention to provide a transistor multivibrator having a low A.-C. output impedance.

It is a further object of this invention to provide an improved method of triggering the transistor multivibrator.

It is a still further object of this invention to provide a multivibrator less susceptible to signal variations and transients.

Other objects of invention will become apparent from the following description taken in connection with the accompanying drawings, in which Fig. 1 is a schematic of the device utilizing positive triggering; and Fig. 2 is a schematic of a modified form of the device.

Referring now to Fig. 1, point contact PNP transistors 1 and 2 have their emitters connected together through diodes 3 and 4 and through common resistor 5 to D.-C. power source $E_x$. Bases of transistors 1 and 2 are connected through resistors 6 and 7, respectively, to ground. Capacitor 8 and resistor 9 are connected in the collector circuit of transistor 1 and capacitor 10 and resistor 11 in the collector circuit of transistor 2. These R-C circuits are connected together to $E_b$, a B supply of about −25 volts. At terminals 12 and 13, alternatively, are received positive pulses to trigger the flip-flop into one state or the other. Terminal 12 is connected through diode 14 to resistor 15 and then to $E_y$, a second B supply of about −15 volts. Resistor 15 is connected through capacitor 16 to the emitter of transistor 1. Terminal 13 is connected through diode 17 to resistor 18 and then to $E_y$, the second B supply. Resistor 18 is connected through capacitor 19 to the emitter of transistor 2. The output terminals 20 and 21, which indicate the state of the flip-flop, are connected to the collectors of transistors 1 and 2, respectively.

It is first assumed that this multivibrator circuit is designed to be bistable, that is, has two stable states. Such a circuit is commonly termed a "flip-flop." At the commencement of operation, say that terminal 20 is in the "true," or more positive state, and that terminal 21 is in the "false," or more negative state. This indicates that transistor 1 is conducting and transistor 2 is not conducting, or conducting very little. It is also assumed that the charges on the two capacitors 8 and 10 of the output state of the flip-flop circuit are stabilized, that is, the transistor flip-flop has been in one state for a sufficient length of time to establish these charges. Therefore, current is flowing through resistor 5, diode 4, transistor 1 and resistor 9. The current flow through transistor 1 is designed to cause point 22 to be more negative than the emitter of transistor 2 and thus causes diode 3 to be biased in the back or high resistance direction. Because of the bias of diode 3, in the high resistance direction, the emitter of transistor 2 lies in a high resistance path and thus conducts very little current. The base of transistor 2 is returned to ground through resistor 7. Therefore, the base of transistor 2 is also positive with respect to point 22. The result is that this transistor circuit is self-stabilizing and remains in a given state until disturbed by an input trigger pulse. Further, each transistor is protected against back currents by the valve action of diodes 3 and 4.

When a trigger pulse of positive amplitude is presented to point 13, diode 17 will conduct and capacitance 19 will pass a positive pulse to the emitter of transistor 2. The positive pulse at the emitter of transistor 2 causes the transistor to commence conducting, causing the emitter to fall to a lower potential which biases diode 3 in the low resistance direction and drops the potential of point 22 even lower than previously, causing diode 4 to become biased in the high resistance or back direction. Thus transistor 2 is now conducting and transistor 1 is nonconducting. This circuit has, therefore, changed state. Following the transient triggering condition, the collector of transistor 2 remains in a comparatively high state and diode 3 continues to conduct, and the circuit remains in this stable state until triggered to return to the first state.

In order to trigger this circuit to the first-mentioned state, point 12 receives a pulse which causes diode 14 to conduct through resistor 15. Capacitor 16 passes the positive pulse to the emitter of transistor 1 which is immediately followed by a transient negative pulse at the emitter, when the transistor commences conduction, which biases diode 4 in the low resistance or forward direction and point 22 is again lowered and diode 3 becomes biased in the high resistance direction.

The use of the capacitors 8 and 10 in the output stage of each of these flip-flops has the advantage that energy can be stored between the clock pulses which are used to sense the state of the flip-flop. A clock pulse is a pulse received from an oscillator, or generator, connected, for example, as shown in Fig. 1. A positive pulse source, clock 29, senses whether transistor 1 is conducting or nonconducting by determining the voltage at point 20 and gating it to terminal 30. Clock 29 pulses only for a short interval and remains off for a long interval. This means a large amount of energy may be removed from large valued capacitors 8 and 10 for a short time while the clock is pulsing the circuit without affecting the stability of the circuit. Also, current may flow into the capacitor at a relatively low rate after the clock pulse disappears; hence the current flows into the capacitor over a much longer period of time than the clock pulse duration. Further, until the clock pulse is present, the flip-flop is isolated from all external loads. In comparison then, with conventional flip-flops, no matching transformers between flip-flops, or transformers of any type, are necessary when several of these are used in conjunction with each other. The A.-C. output impedance of the circuit is very low because of the large capacitors 8 and 10.

The multivibrator has thus far been treated as bistable. However, utilizing the concept of the invention, it is readily adaptable to acquire either free-running or monostable characteristics. A monostable multivibrator may be described as one which has a first, stable state, and upon a triggering pulse changes to a second, unstable state. It spontaneously thereafter reverts to its original, stable state. In order to modify the circuit of Figs. 1 and 2 to make the multivibrator monostable, it is only necessary that the relative values of certain components be changed. Resistor 7, for example, might be increased, approximately doubled, in order to do this. This changes the potential of the base electrode and the current then flowing through transistor 2 is not sufficient to maintain point 22 at a low potential to keep diode 4 from again commencing to conduct. When transistor 1 commences to conduct, unaltered resistor 6 maintains the base electrode of transistor 1 at a potential so that sufficient current flows through diode 4 to keep point 22 low enough to prevent transistor 2 from conducting. This circuit is, consequently, monostable.

A free-running multivibrator is one which is oscillatory, that is, first one transistor conducts and then the other, without any required triggering. In order to acquire this, the circuit of Fig. 1 is modified in that resistor 5 is decreased in value. As a result, one transistor conducts and its R-C circuit becomes charged, and that transistor ceases conducting, and the other transistor commences conducting and cuts off the first transistor. Functionally, the reduction of resistor 5 reduces the emitter-to-collector impedance of both transistors. An increase in value of both resistors 6 and 7 would also cause this device to be oscillatory, or free-running.

Fig. 2 illustrates a slightly different method of triggering the transistors. Terminal 12 is now connected through resistor 23 to $E_b$, the B supply of about −25 volts, and an input positive pulse to terminal 12 is expressed across capacitor 24 which is received by diode 25 and resistor 26. Diode 25 is connected through resistor 27 to $E_x$, a B supply. Resistor 27 is connected through diode 28 to the emitter of transistor. Assuming that a positive trigger pulse is received at terminal 12, it is received through capacitor 24 at the cathode of diode 25 which ceases conducting, allowing the anode of diode 28 to rise and conduction begins through diode 28 and resistor 27 and the positive pulse is received at the emitter of transistor 1 and immediately followed by a transient negative pulse which biases diode 4 in the low resistance or conducting direction. Resistor 26, together with resistor 27, establishes a bias voltage across diode 25. A similar pulse input circuit is provided to the flip-flop from terminal 13.

Typical circuit values are as follows:

$E_b$=25 volts $E_x$=50 volts $E_y$=15 volts

Resistors:

| | |
|---|---|
| (5) 18K ohms | (11) 3.9K |
| (6) 3.9K | (15) 18K |
| (7) 3.9K | (18) 18K |
| (9) 3.9K | |

All capacitors are 2700 micromicrofarads.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a transistor multivibrator, a pair of point contact transistors, a respective capacitor and resistor connected in parallel in the collector circuits of said transistors, a first power source connected in the collector circuits of said transistor, a respective diode connected in the emitter circuit of each said transistor, said diodes directed to conduct in the same direction as their respective transistors, a common resistor and a second power source connected in the emitter circuit of said transistor, a respective return resistor connected in the base circuit of each said transistor, the current flow through said transistors and their respective diodes being operably adjusted so that the initiation of current flow through one of said diodes creates a voltage drop across said common resistor sufficient to bias the other of said diodes in a nonconducting direction, alternating current coupling means connected to said emitter, said coupling means providing a positive and negative going pulse at said emitter, and said coupling means comprising serially connected diodes and capacitors, said capacitors being directly connected to respective emitters, and said latter diodes being connected to receive input pulses.

2. In a transistor multivibrator, a pair of transistors, a respective resistor and capacitor connected in parallel in the collector to emitter circuit of each said transistor, a resistor commonly connected in the emitter circuits of both said transistors, a first diode connected in the emitter circuit of one of said transistors, a second diode connected in the emitter circut of the other of said transistors, said diodes being poled in the same direction of conduction as their respective transistor emitters, a respective base return circuit connected to each said transistor, circuit means for conducting a pulse to the emitter of at least one of said transistors comprising a third diode and a power source connected to bias said third diode, said circuit means further comprising capacitor alternating current coupling means connected to said emitter, said alternating current coupling means being directly connected between said third diode and said emitter.

References Cited in the file of this patent

UNITED STATES PATENTS

| | | |
|---|---|---|
| 2,622,212 | Anderson et al. | Dec. 16, 1952 |
| 2,670,445 | Felker | Feb. 23, 1954 |
| 2,707,752 | Gabler | May 3, 1955 |
| 2,724,061 | Emery | Nov. 15, 1955 |
| 2,757,286 | Wanlass | July 31, 1956 |
| 2,802,941 | McConnell | Aug. 13, 1957 |

FOREIGN PATENTS

| | | |
|---|---|---|
| 162,171 | Australia | Mar. 24, 1955 |